(12) United States Patent
Patil et al.

(10) Patent No.: US 6,482,638 B1
(45) Date of Patent: Nov. 19, 2002

(54) HEAT-RELAXABLE SUBSTRATES AND ARRAYS

(75) Inventors: Sanjay L. Patil, Minneapolis, MN (US); Daniel C. Duan, St. Paul, MN (US); Kurt J. Halverson, Lake Elmo, MN (US); Pierre H. LePere, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/708,916

(22) Filed: Nov. 8, 2000

Related U.S. Application Data

(63) Continuation-in-part of application No. 09/459,418, filed on Dec. 9, 2000, now abandoned.

(51) Int. Cl.$^7$ .............................. C12M 1/34; C12Q 1/68; C12P 19/34; G01N 15/06; C07H 21/02

(52) U.S. Cl. ...................... 435/287.2; 435/6; 435/91.1; 435/287.1; 422/68.1; 536/23.1

(58) Field of Search .................... 435/6, 91.1, 91.2, 435/183, 287.1, 287.2, 283.1, 286.1; 436/94; 536/23.1, 24.3, 24.33, 25.3; 422/50, 68, 82.05, 82.09

(56) References Cited

U.S. PATENT DOCUMENTS

| | | | |
|---|---|---|---|
| 3,853,467 A | | 12/1974 | Giaever |
| 3,926,564 A | | 12/1975 | Giaever |
| 4,266,108 A | | 5/1981 | Anderson et al. |
| 4,962,000 A | * | 10/1990 | Emslander et al. ......... 428/461 |
| 4,985,300 A | | 1/1991 | Huang |

(List continued on next page.)

FOREIGN PATENT DOCUMENTS

| | | | |
|---|---|---|---|
| GB | 2 065 298 A | 6/1981 | |
| JP | 10 254362 | 9/1998 | ............. G09F/3/04 |
| WO | WO 98/45406 | 10/1998 | |
| WO | WO 99/53319 | * 10/1999 | |

OTHER PUBLICATIONS

Schena et al., Parallel human genome analysis: Microarray–based expression monitor of 1000 genes. Proc. Natl. Sci. USA, 93, 10614–10619, 1996.*

David Freifelder (1982) Physical Biochemistry: Applications to Biochemistry and Molecular Biology, Second Edition, pp. 496–498. Published by W.H.Freeman and Company.*

Martynova et la., "Fabrication of Plastic Microfluid Channels by Imprinting Methods," *Anal. Chem.,* 69(23): 4783–4789 (1997).

*Primary Examiner*—Ethan C. Whisenant
*Assistant Examiner*—Frank Lu
(74) *Attorney, Agent, or Firm*—Christopher D. Gram; Paul W. Busse; Robert W. Sprague

(57) ABSTRACT

Articles, such as high density arrays, on heat-relaxable substrates that can be relaxed by exposure to thermal energy are disclosed, along with methods of manufacturing the arrays, and systems/apparatus for relaxing arrays using electromagnetic energy. The arrays may themselves include electromagnetic energy sensitive material in their construction, in which case exposure of the arrays to suitable electromagnetic energy can provide the thermal energy required to cause the arrays to relax. In other embodiments, the arrays may not include an electromagnetic energy sensitive material in their construction, in which case the arrays may be heated indirectly, i.e., by locating the arrays within a system or apparatus that includes an electromagnetic energy sensitive material and transferring the thermal energy from the electromagnetic energy sensitive material to the array by, e.g., conduction.

19 Claims, 4 Drawing Sheets

U.S. PATENT DOCUMENTS

| | | |
|---|---|---|
| 5,128,504 A | 7/1992 | McGaffigan et al. ..... 219/10.43 |
| 5,278,377 A | 1/1994 | Tsai |
| 5,317,045 A | 5/1994 | Clark, Jr. et al. |
| 5,446,270 A | 8/1995 | Chamberlain et al. |
| 5,529,708 A | 6/1996 | Palmgren et al. |
| 5,541,057 A | 7/1996 | Bogart et al. |
| 5,720,834 A | 2/1998 | Steele et al. .................. 156/86 |
| 5,916,203 A | 6/1999 | Brandon et al. |
| 5,925,455 A | 7/1999 | Bruzzone et al. |
| 6,156,478 A * | 12/2000 | Liu et al. ................. 430/270.1 |
| 6,013,789 A1 * | 1/2001 | Rampal ..................... 526/25.3 |
| 6,376,619 B1 * | 4/2002 | Halverson et al. ....... 525/330.3 |
| 6,395,483 B1 * | 5/2002 | Patil et al. ..................... 435/6 |

* cited by examiner

HEAT-RELAXABLE SUBSTRATES AND ARRAYS

This application is a continuation-in-part of U.S. patent application Ser. No. 09/459,418 filed on Dec. 9, 2000, now abandoned.

FIELD OF THE INVENTION

The present invention relates to heat-relaxable substrates. More particularly, the present invention provides high density arrays on heat-relaxable substrates, along with methods and apparatus for relaxing substrates using electromagnetic energy.

BACKGROUND

Arrays may be used in a variety of applications, such as gene sequencing, monitoring gene expression, gene mapping, bacterial identification, drug discovery, and combinatorial chemistry. Many of these applications involve expensive and oftentimes difficult to obtain samples and reagents. Accordingly, high density arrays are desirable because the use of such arrays may dramatically increase efficiency with respect to limited or expensive samples when compared to standard arrays, such as a 96 well plate. For example, a 96 well plate may require several hundred microliters of sample per well to run a diagnostic experiment whereas a high-density array would require only a fraction of that sample for the entire array. In addition to the reduction of volume, miniaturization allows hundreds or thousands of tests to be performed simultaneously. Furthermore, a high-density array may be more versatile than a standard array because of the wide variation of chemistries that may be present on a single array.

Problems in the manufacturing of high-density arrays on standard substrates, e.g., glass microscope slides, include the need for multiple steps to produce the arrays with densely packed reactants. The manufacture of high-density arrays is further complicated when different chemistries are required at different binding sites on the arrays, such as required for manufacturing nucleic acid arrays.

Attempts to address the need for high-density arrays have included using oriented polymeric films in place of glass slides as the substrate for the arrays. The arrays can include binding sites formed on the oriented polymeric films in a larger format that is easier to manufacture, after which the oriented polymeric films can be relaxed by applying thermal energy to the substrate to provide arrays with high-density sites. Examples of such arrays are described in WO 99/53319 (HIGH DENSITY, MINIATURIZED ARRAYS AND METHODS OF MANUFACTURING SAME, published Oct. 21, 1999) and commonly assigned U.S. patent application Ser. No. 09/287,379, filed Apr. 7, 1999, entitled HIGH DENSITY, MINIATURIZED ARRAYS AND METHODS OF MANUFACTURING SAME.

Although the oriented polymeric films provide significant advantages in array manufacturing, their use does pose additional problems during the substrate relaxation process. One potential problem is achieving uniform transmission of thermal energy to the array substrate. Another potential problem is curling or other distortion of the substrate during the application of thermal energy to induce relaxation.

Oriented polymeric films used in, e.g., packaging applications, are typically relaxed using thermal energy supplied by air. When used as packaging, however, the flatness of the film after relaxation is typically not important because the film is constrained around a package, typically conforming to the shape of the package. In applications where a flat film is desired after relaxation, the film is typically placed in tension. An example of one such application is in the use of oriented polymeric films over windows to prevent drafts, provide additional insulation, etc. When used on windows, the film is held in tension between, e.g., adhesive tapes applied to the window frame. When provided as the substrate of an array, however, the film is not so constrained or tensioned, thereby causing the potential for curling as described above.

Another issue to address is how to quickly and efficiently supply the thermal energy required to relax the film. The use of conductive heating devices, e.g., hot plates, may require the constant attention of an operator or feedback control systems to prevent overheating and/or uneven heating of the film.

Another concern with heat-relaxable arrays manufactured with attached or embedded materials that make the array useful for bioanalytical applications, e.g., DNA, RNA, proteins, polysaccharides, antibodies, etc., is that the application of excessive thermal or other forms of energy may adversely affect the functional performance of the materials on the array. invention provides articles, such as high density arrays, including heat-relaxable substrates that can be relaxed by exposure to electromagnetic energy. Methods of relaxing arrays including heat-relaxable substrates and reactants affixed thereto are also provided in connection with the present invention. In still other embodiments, the present invention also provides methods of manufacturing such articles, as well as systems and apparatus for relaxing the same using electromagnetic energy.

In some embodiments, the substrates suitable for use in manufacturing arrays may themselves include electromagnetic energy sensitive Curie point material in their construction, in which case exposure of the substrates to suitable electromagnetic energy can provide the thermal energy required to cause the substrates to relax. The substrates may additionally comprise linking agents or masks, in which case the electromagnetic energy sensitive material may be included in the linking agents or masks. Such methods for providing energy may be referred to as direct heating, i.e., no additional apparatus must be supplied to cause the conversion of electromagnetic energy to heat that is used to relax the substrates.

In preferred embodiments, the substrates include a coating of linking agents, with electromagnetic sensitive material included in the substrate. In a most preferred embodiment, arrays include reactants affixed to the substrates.

Substrates that include an electromagnetic energy sensitive material in their construction may also be placed in a system or apparatus that also includes the same or a different electromagnetic energy sensitive material to provide the thermal energy needed to relax the substrate when exposed to electromagnetic energy.

In its various aspects, the present invention provides a convenient manner of relaxing substrates that include heat-relaxable material. The amount of energy supplied to relax the substrates can be easily controlled and the process can be performed quickly and economically.

In preferred embodiments, wherein reactants are affixed to the substrates, additional benefits may be achieved. For example, after relaxation, the resulting high density arrays can provide a level of flatness useful in activating accurate hybridization results.

In another aspect of the invention, methods are provided for relaxing a substrate. In one embodiment, a method includes providing an array including a heat-relaxable substrate and reactants affixed thereto; providing electromagnetic energy sensitive material In preferred embodiments, wherein reactants are affixed to the substrates, additional benefits may be achieved. For example, after relaxation, the resulting high density arrays can provide a level of flatness useful in achieving accurate hybridization results.

In another aspect of the invention, methods are provided for relaxing a substrate. In one embodiment, a method includes providing an array including a heat-relaxable substrate and reactants affixed thereto; providing electromagnetic energy sensitive material in proximity to the substrate; and directing electromagnetic energy towards the electromagnetic energy sensitive material, wherein the electromagnetic energy is converted into thermal energy and conducted to the heat-relaxable material, thereby causing the heat-relaxable material in the substrate to relax.

In another aspect, the present invention provides apparatus for relaxing heat-relaxable articles. In one aspect, the present invention includes the apparatus having a first surface; a second surface opposed to and spaced from the first surface; and electromagnetic energy sensitive material in thermal communication with the first surface, whereby heating of the electromagnetic energy sensitive material by electromagnetic energy increases the temperature of the first surface.

These and other features and advantages of the present invention are described in connection with illustrative embodiments of the invention below.

GLOSSARY

For purposes of this invention, the following definitions shall have the meanings set forth.

"Affix" shall include any mode of attaching reactants to a substrate. Such modes shall include, without limitation, covalent and ionic bonding, adherence, such as with an adhesive, and physical entrapment within a substrate. In the case of linking agents, reactants may be affixed to the substrate by linking agents that are created by functionalizing a surface, such as with an acid wash, or by linking agents that are coated on the substrate.

"Analyte" shall mean a molecule, compound, composition or complex, either naturally occurring or synthesized, to be detected or measured in or separated from a sample of interest. Analytes include, without limitation, proteins, peptides, amino acids, fatty acids, nucleic acids, carbohydrates, hormones, steroids, lipids, vitamins, bacteria, viruses, pharmaceuticals, and metabolites.

"Binding site" shall mean a discrete location on a substrate wherein reactants are affixed thereto. A single binding site may include a quantity of one or more of the same reactants affixed to the substrate.

"Curie point material" shall mean a magnetic material having a Curie temperature sufficiently high to raise a "Heat-relaxable" material to or above its relaxation temperature when exposed to electromagnetic energy "Electromagnetic energy" shall mean energy having rapidly oscillating electric and magnetic components, regardless of wavelength or frequency, that can provide the energy required to relax an array, e.g., microwave energy and radio-frequency (RF) energy.

"Heat-relaxable" shall mean, in the context of a material, such as a substrate, that the material undergoes some relaxation in at least one dimension in response to the transmission of thermal energy into the material.

"Linking agent" shall mean any chemical species capable of affixing a "Reactant" to the substrate.

"Microwave energy" shall mean electromagnetic energy having a frequency in the range of from about $10^8$ Hz to about $3 \times 10^{11}$ Hz.

"Radio Frequency (RF) energy" shall mean electromagnetic energy having a frequency in the range of from about $10^4$ Hz to about $10^7$ Hz.

"Reactant" shall mean any chemical molecule, compound, composition or complex, either naturally occurring or synthesized, that is capable of binding an analyte in a sample of interest either alone or in conjunction with a molecule or compound that assists in binding the analyte to the substrate, such as, for example, a coenzyme. The reactants of the present invention are useful for chemical or biochemical measurement, detection or separation. Accordingly, the term "Reactant" specifically excludes molecules, compounds, compositions or complexes, such as ink, that do not bind analytes as described above. Examples of reactants include, without limitation, amino acids, nucleic acids, including oligonucleotides and cDNA, carbohydrates, and proteins such as enzymes and antibodies.

"Relaxation temperature" shall mean the temperature at which a heat-relaxable material exhibits a desired amount of relaxation.

DETAILED DESCRIPTION OF ILLUSTRATIVE EMBODIMENTS OF THE INVENTION

The present invention provides articles including heat-relaxable substrates suitable for use in, e.g., manufacturing arrays. The present invention also provides high density arrays on heat-relaxable substrates, along with methods and apparatus for relaxing substrates using electromagnetic energy. The methods include methods of manufacturing arrays and methods of relaxing the substrates using electromagnetic energy. The apparatus are useful in combination with the arrays to provide high-density arrays that are generally flat.

Figure 1:
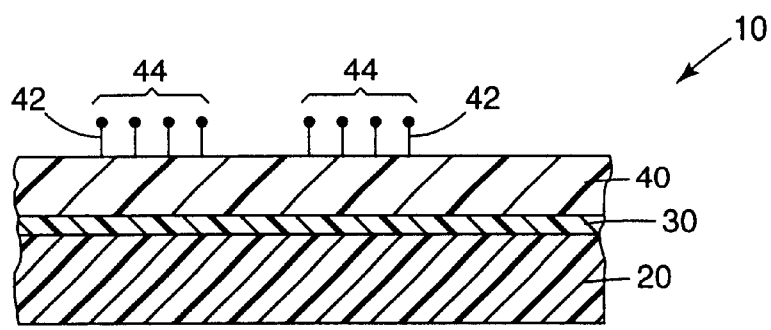
FIG. 1 is a cross-sectional view of a portion of one array according to the present invention.
Figure 2:
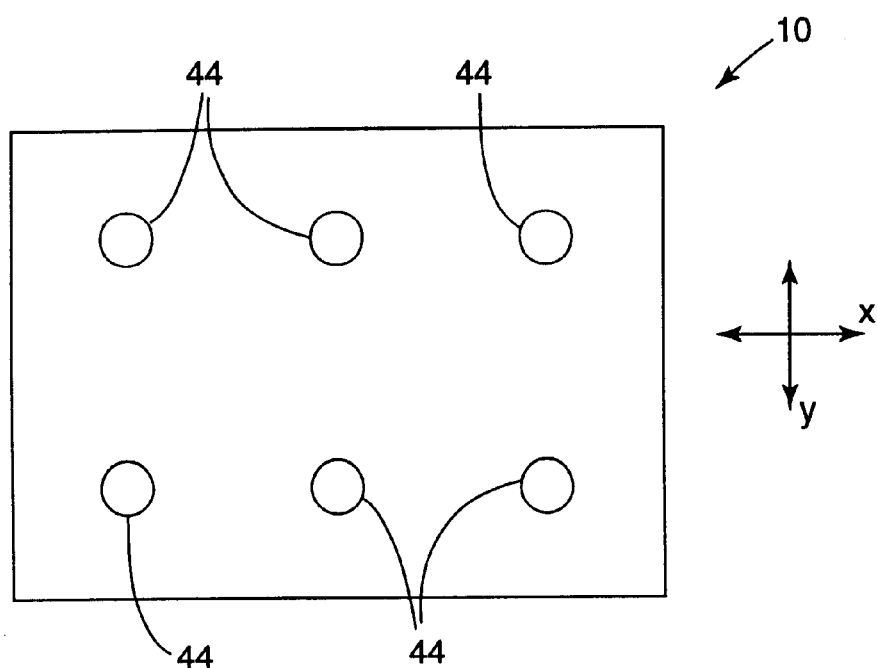
FIG. 2 is a plan view of the array of FIG. 1 before relaxation.
Figure 3:
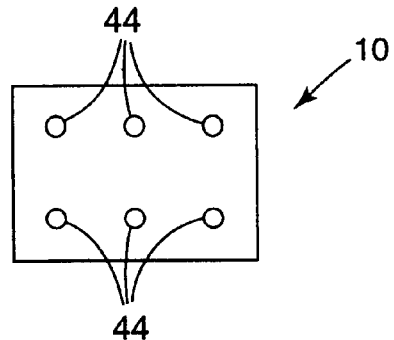
FIG. 3 is a plan view of the array of FIG. 2 after relaxation.

With reference to FIGS. 1–3, an array 10 is illustrated and includes a heat-relaxable substrate 20, a layer 30 including electromagnetic energy sensitive material on the substrate 20 and a linking agent coating 40 on the layer 30. The substrate 20 is preferably provided as a film with a thickness of, e.g., about 0.005 millimeters (mm) to about 0.05 mm.

The substrate 20 is preferably constructed of a heat-relaxable material such as an oriented polymer. It may be preferred that the substrate 20 consists essentially of heat-relaxable material, although some fillers and other inactive materials may be included. It is preferred, however, that the heat-relaxable material cause substantially the entire substrate 20 to relax upon the application of thermal energy. That relaxation is preferably, but not necessarily, generally uniform in the in-plan directions (see, e.g., the "x" and "y" directions in FIG. 2) over the major surfaces of the substrate 20.

Although the heat-relaxable material is described herein as causing the substrate 20 to relax, it should be understood that the relaxation is primarily in the size of the major surfaces of the substrate 20. The thickness of the substrate 20 may, however, actually increase as a result of the relaxation.

Some preferred oriented polymers that can be used as the heat-relaxable material in the substrates 20 of the present invention include biaxially oriented low-density polyethylenes; biaxially oriented linear low-density polyethylenes, and biaxially oriented ultra low-density polyethylenes. Biaxially oriented substrates are preferred because they exhibit relaxation in two orthogonal in-plane directions (see, e.g., the "x" and "y" directions in FIG. 2). Other oriented substrates that may be suitable for use in the present invention uniaxially, biaxially, or multiaxially oriented substrates made by any process known to the art, including but not limited to melt-orientation; the blown film, bubble, double-bubble, and tubular processes; length orientation; the process of tentering; extension over a mandrel; thermoforming; and blow molding.

Polymers which may be employed in substrates of the invention include, but are not limited to, polyethylenes, including high density polyethylene, low density polyethylene, linear low density polyethylene, ultra low density polyethylene, and copolymers of ethylene (including ethylene propylene copolymers and ethylene vinyl acetate copolymers); polyolefins, including isotactic polypropylene, syndiotactic polypropylene, and polymethylpentene; polyacetals; polyamides, including polyamide 6 and polyamide 66; polyesters, including polyethylene terephthalate, polybutylene terephthalate, and polyethylene naphthalate; halogenated polymers, including polyvinyl chloride, polyvinylidene chloride, polychlorotrifluoroethylene, polyvinyl fluoride, and polyvinylidene fluoride; styrene polymers, including general purpose polystyrene and syndiotactic polystyrene; cellulose esters, including cellulose acetate and cellulose propionate; polyketones, including polyetheretherketone and copolymers and terpolymers of carbon monoxide with ethylene and/or propylene; polycarbonates, including the polycarbonate of bisphenol A; phenyl-ring polymers, including polyphenylene sulfide; polysulfones; polyurethanes; polymers of acrylic and methacrylic acids and their esters; ionomers; and copolymers, blends, or layered structures of any of the above-named polymers. Oriented substrates of any of these polymers may be optionally cross-linked.

Regardless of its composition, the oriented polymer substrate 20 can be relaxed by the application of thermal energy after it has been manufactured. The amount of relaxation observed in the substrate 20 depends at least partially on the degree to which the substrate 20 was oriented during manufacturing. The relaxation need not be equal in any two orthogonal directions within the plane of the substrate 20, although substantially uniform relaxation in the two orthogonal directions is preferred. In considering relaxation as a function of direction in the substrate plane, substantial uniformity of directionally-dependent relation from point to point within the substrate 20 is preferred; that is, the substrate preferably relaxes in substantially the same amount in each direction, regardless of position on the substrate. If the substrate 20 does not exhibit substantially uniform relaxation characteristics, a registration indicator system may be added to the binding sites 44 or otherwise employed to register the binding sites in the finished array.

While the starting materials for the substrate 20 are preferably oriented polymers, the oriented polymers in the array substrates 20 are preferably no longer oriented and, in fact, may be isotropic after relaxation.

The layer 30 including electromagnetic energy sensitive material that is provided on the substrate 20 can take a variety of forms. Examples of some suitable materials may include those described in U.S. Pat. Nos. 5,278,377 (Tsai); 5,446,270 (Chamberlain et al.); 5,529,708 (Palmgren et al.); and 5,925,455 (Bruzzone et al.).

Although the layer 30 is depicted as being in direct contact with the substrate 20, one or more interesting layers may be located between the layer 30 and substrate 20 provided that the electromagnetic energy sensitive material in the layer 30 is in thermal communication with the heat-relaxable material in the substrate 20 such that thermal energy in layer 30 is conducted to the substrate 20.

Regardless of its specific form, however, the electromagnetic energy sensitive material in the layer 30 absorbs electromagnetic energy and converts the incident electromagnetic energy into heat such that the thermal energy of the electromagnetic energy sensitive material increases. That thermal energy is then transmitted to the heat relaxable material of the substrate 20 (typically through conduction). The thermal energy raises the temperature of the heat-relaxable material in the substrate. The amount of relaxation is dependent upon the heat-relaxable material in the substrate 20, the temperature to which the heat-relaxable material is heated, and whether the substrate 2 is constrained during heating and/or subsequent cooling.

The heat-relaxable material is preferably raised to at least its relaxation temperature. As defined above, the relaxation temperature is the temperature at which a desired amount of relaxation, e.g., as described in WO 99/53319, is obtained.

Where the electromagnetic energy is to be provided in the form of microwave energy, any one or more of three phenomena may result in the conversion of the microwave energy to thermal energy. Those phenomena include dielectric heating due to electric dipole interaction with the electric field component of the incident microwave energy. Another phenomenon that may be involved in the energy conversion is resistive heating, in which the oscillating electric field component of the incident microwave energy interacts with conduction band electrons in the material. Yet another phenomenon that may be experienced is magnetic heating, in which magnetic dipole interaction of the material with the oscillating magnetic field component of the incident microwave energy heats the material.

One characterization of an electromagnetic energy sensitive material used in connection with the present invention can be based on the dielectric loss factor of the electromagnetic energy sensitive material. In general, the relative dielectric loss factor of a material indicates the ability of the material to generate thermal energy via friction in an oscillating electromagnetic (microwave) field. For most arrays of the present invention, the materials used for the substrate 20, e.g., oriented polymers, do not, alone, show any appreciable relaxation when exposed to electromagnetic radiation such as microwaves or RF energy.

For example, the electromagnetic energy sensitive material will typically possess a relative dielectric loss factor that is greater than the relative dielectric loss factor of the heat-relaxable material of the substrate 20. In such a configuration, the thermal energy of the electromagnetic energy sensitive material will increase more rapidly than the thermal energy of the heat-relaxable material when subjected to microwave energy (understanding that the thermal energy of the heat-relaxable material and other constituents in the substrate 20 may not increase at all upon exposure to microwave energy). As the thermal energy of the electromagnetic energy sensitive material increases, at least a portion of the thermal energy is transmitted to other materials in the contact with the electromagnetic energy sensitive material.

As illustrated in FIG. 1, electromagnetic energy sensitive material can be provided as a part of the array 10 in the form of a coating or layer 30, substantially all of which is an electromagnetic energy sensitive material. In other words, the layer 30 may consist essentially of an electromagnetic energy sensitive material. For example, the layer 30 may be metallic, e.g., it includes one or more metals, one or more metallic compounds, or combinations of one or more metals and one or more metallic compounds. The metals or metallic compounds of layer 30 are preferably of the type that absorb electromagnetic energy and convert that energy into thermal energy.

Where layer 30 is metallic, the composition and/or thickness of the layer may be selected, at least in part, on the frequency of electromagnetic energy to be used to heat the substrate 20. Where microwave energy is to be used, it may be preferred that the metallic layer be relatively thin. If the metallic layer is too thick, it may crack and cause arcing during heating of the substrate 20 or it might not heat sufficiently to relax the substrate. Another consideration in selecting the thickness of a metallic layer 30 is that a layer that is too thick may constrain the substrate 20 from relaxing in response to the application of thermal energy.

In some embodiments where layer 30 is metallic and microwave energy is to be used as the energy source, it may be preferred that the layer 30 be, e.g., about 100 Angstroms thick or less. Another manner in which to characterize the thickness of the layer 30 is by the optical density of the layer, typically measured before the arrays are relaxed. For example, it may be preferred that the optical density of the layer 30 on the substrate 20 be about 0.5 or less before relaxation, optionally even more preferably about 0.3 or less.

If the thermal energy is to be supplied to the array 10 in the form of RF energy and the layer 30 is metallic, it may be thicker than if microwave energy was to be used to heat the substrate 20. The upper limit of any metallic layer to be used for RF induction will typically be controlled by the propensity of thicker metallic layers to prevent or constrain the array from relaxing in response to heating.

One potential advantage of array 10 is that if the layer 30 includes one or more metals, one or more metallic compounds, or combination of one or more metals and one or more metallic compounds, then layer 30 may also function as a mask layer to reduce background fluorescence from the substrate 20. Such mask layers are discussed in copending, commonly-assigned U.S. patent application Ser. No. 09/410,863, filed on Oct. 1, 1999, entitled ARRAYS WITH MASK LAYERS AND METHODS OF MANUFACTURING THE SAME.

Although illustrated as a generally continuous layer 30 on the substrate 20, it should be understood that the thickness of the layer 30 may vary to provide improved control over the amount of electromagnetic energy converted to thermal energy (and, thus, available for transfer to the substrate 20). Another alternative for controlling the conversion process includes providing layer 30 in a discontinuous pattern on the substrate 20. In some instances, it may be desirable to provide both variations in thickness and a discontinuous pattern to improve control over the relaxation process.

As illustrated in FIG. 1, the array 10 may also include a coating 40 that includes linking agents. The linking agents in coating 40 are selected based on the reactants 42 to be affixed to the array 10 and the application for which the array 10 will be used. It is preferred, but not required, that the linking agent coating 40 be applied over substantially all of the surface of the substrate 20. One example of a suitable linking agent useful in many different arrays is an azlactone moiety.

Reactants 42 can be affixed to the array 10 to create binding sites 44 as depicted in FIGS. 1–3, where FIG. 2 is top plan view of the front side of the array 10 before relaxation and FIG. 3 is a top plan view of the array 10 after relaxation. As described in, e.g., WO 99/53319 (HIGH DENSITY, MINIATURIZED ARRAYS AND METHODS OF MANUFACTURING SAME, published Oct. 21, 1999), any number of processes known in the art may be used to introduce the reactants 42 to be affixed to the linking agent coating 40. The mode of affixation may vary in accordance with the reactant or reactants employed.

The type of reactant 42 used in the present invention will vary according to the application and the analyte of interest. For example, when characterizing DNA, oligonucleotides may be preferred. When conducting diagnostic tests to determine the presence of an antigen, antibodies may be preferred. In other applications, enzymes may be preferred. Accordingly, suitable reactants include, without limitation, amino acids, nucleic acids, including oligonucleotides and cDNA, carbohydrates, and proteins such as enzymes and antibodies.

With reference to FIGS. 2 and 3, in one embodiment, a variety of nucleic acids, such as oligonucleotides can be affixed at separate binding sites 44. The variety of oligonucleotides at the different binding sites 44 permits a large number of potential binding events between reactants and target analytes in a sample.

The reactants 42 may be affixed to the binding sites 44 prior to, during or after relaxation of the underlying substrate 20. However, it is preferred to affix the reactants 42 prior to relaxing the substrate 20 to take advantage of the methods of the present invention for providing high-density arrays including high reactant binding site densities.

Figure 4:
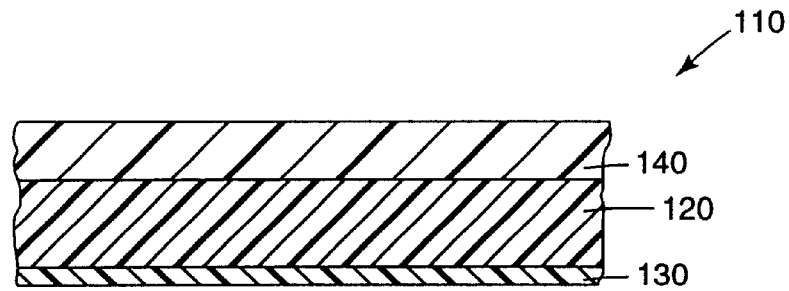
FIGS. 4–9 are cross-sectional views of alternative articles according to the present invention.

The array 10 of FIGS. 1–3 illustrates only one construction of arrays that are relaxable using electromagnetic energy. FIG. 4 illustrates another article 110 that includes a substrate 120 similar to the substrate 20 of array 10 described above. The article 110 also includes an optional linking agent coating 140. A difference in the construction of article 110 from array 10 illustrated in FIG. 1 is that the layer 130 including the electromagnetic energy sensitive material is located on the opposite of the substrate 120 from the linking agent coating 140.

Figure 5:
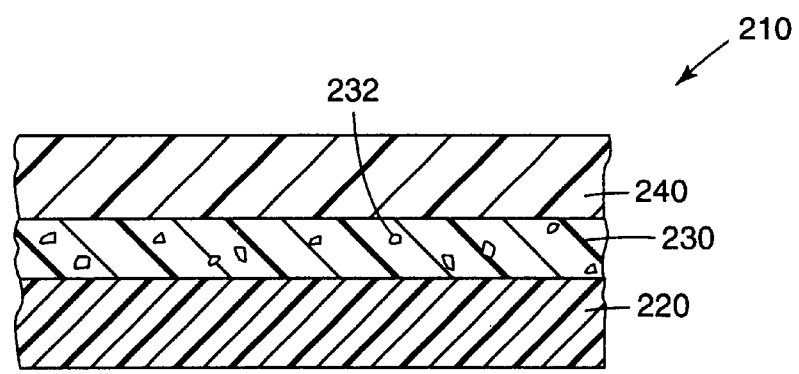

FIG. 5 illustrates another construction in which the article 210 includes a substrate 220 including heat-relaxable material and a linking agent coating 240. In between these two layers are a layer 230 including particles 232 of electromagnetic energy sensitive material located in a matrix. The thermal energy induced in the layer 230 by the particles 232 of electromagnetic energy sensitive material is preferably transmitted to the underlying substrate 220.

Figure 6:
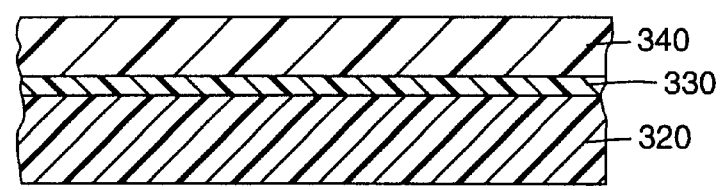

FIG. 6 illustrates yet another embodiment of an article 310 designed to relax in response to exposure to electromagnetic energy. The article 310 includes a substrate 320 of a heat-relaxable material and a linking agent coating 340. The electromagnetic energy sensitive material in layer 330 in this embodiment may preferably be a Curie point material (one example of which is discussed in U.S. Pat. No. 5,278, 377).

It is generally preferred that the Curie point material possess a Curie temperature that is at least about as high as the relaxation temperature of the heat-relaxable material. To prevent or reduce the chance of overheating the article 310, it may be preferred that the Curie temperature be no greater than about 10° C. above the relaxation temperature, more preferably no greater than about 20° C. above the relaxation temperature.

Depending on the properties of the heat-relaxable material, it may be preferred that the Curie temperature of the Curie point material be at least as high as the glass transition temperature ($T_g$) of the heat-relaxable material used in the substrate 320. It may further be preferred that the Curie temperature be at least about 10° C. above the $T_g$ of the of the heat-relaxable material in the substrate 320. To prevent or reduce the chance of overheating the article 310, it may optionally be preferred that the Curie temperature be no greater than about 20° C. above the $T_g$ of the heat-relaxable material in the substrate 320.

Alternatively, some heat-relaxable materials that may be used in substrates of the present invention may exhibit relaxation as the heat-relaxable material passes through its crystalline melt transition. For those materials, it may be preferred that the Curie temperature be at least as high as the crystalline melt temperature ($T_m$) of the heat-relaxable material used in the substrate 320. To prevent or reduce the chance of overheating the article 310, it may optionally be preferred that the Curie temperature be no greater than about 10° C., more preferably no greater than about 20° C., above the $T_m$ of the heat-relaxable material in the substrate 320.

In another manner of characterizing the Curie point materials used in connection with the present invention, it may be preferred that the Curie temperature of the materials be about 175° C. or less, alternatively about 165° C. or less, and, in yet another alternative, about 155° C. or less.

Curie point materials react to the magnetic component of microwave energy and convert the absorbed energy to thermal energy at a relatively high rate until the material reaches a particular temperature (the Curie point). Once the Curie point temperature is reached, the rate at which the Curie point materials react to the magnetic component of the electromagnetic energy is reduced, which limits the temperature to which the materials are heated. Further control over the heating may be obtained by locating an electrically conductive ground plane in proximity to the Curie point material to eliminate heating of the Curie point material due to the electric field component of the incident energy, and thereby enhancing heating of the magnetic field component.

Although layer 330 is illustrated as being a single, homogeneous layer, the Curie point material may be provided in particulate or another dispersed form within a matrix. For example, the Curie point material may be held within a polymeric matrix, with the matrix and the Curie point material together making up the layer 330.

Figure 7:
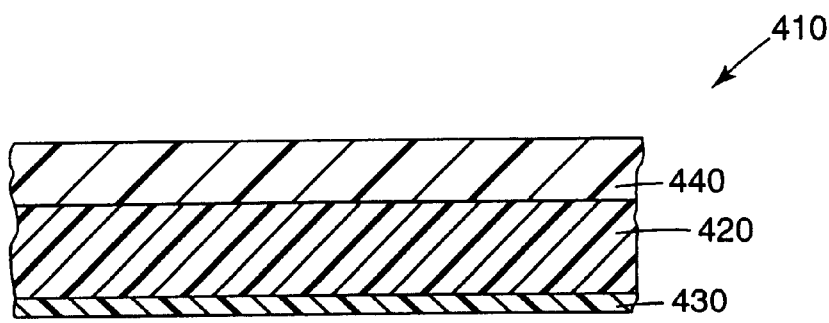

FIG. 7 illustrates a variation from the article 310 of FIG. 6. The article 410 of FIG. 7 includes a substrate 420 and a linking agent coating 440. Also in the article 410 is a layer 430 including an electromagnetic energy sensitive material, preferably a Curie point material. The difference in the article 410 from the article 310 is that the linking agent coating 440 is separated from the layer 430 including the electromagnetic energy sensitive material by the substrate 420. This separation may help to further insulate or protect the linking agent coating 440 from the effects of excessive thermal energy from the layer 430.

Figure 8:
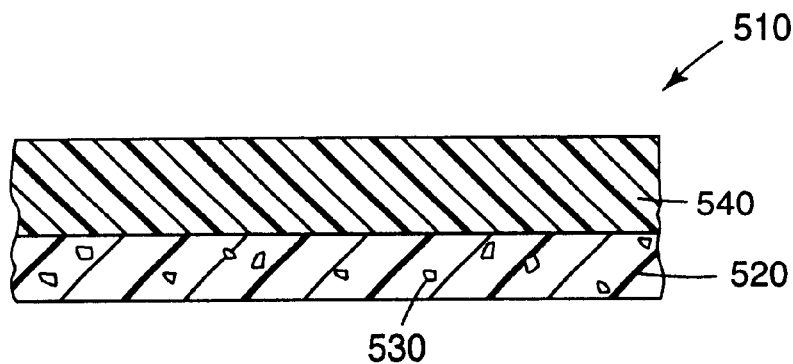

FIG. 8 illustrates yet another embodiment of the invention in which an article 510 is provided that includes a substrate 520 and a linking agent coating 540. Particles 530 of an electromagnetic energy sensitive material are located within the substrate 520 which effectively functions as a matrix for the particles 530. Electromagnetic energy absorbed by the particles 530 of electromagnetic energy sensitive material and converted to thermal energy can be conductively transmitted to the heat-relaxable material of the substrate 520 surrounding each of the particles 530.

Figure 9:
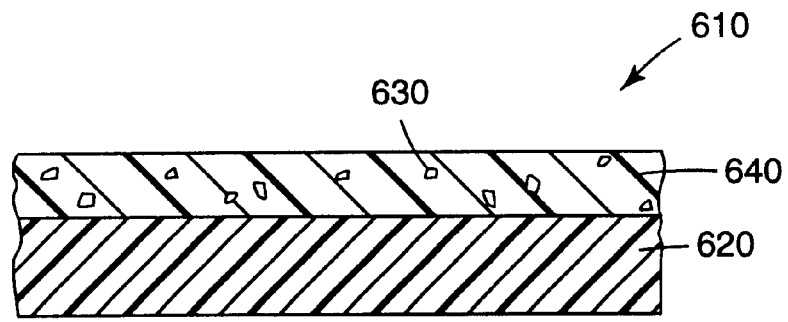

FIG. 9 illustrates another embodiment of an article 610 including a substrate 620 and a linking agent coating 640. The electromagnetic energy sensitive material in the article 610 is provided as particles 630 dispersed in the linking agent coating 640.

Figure 10:
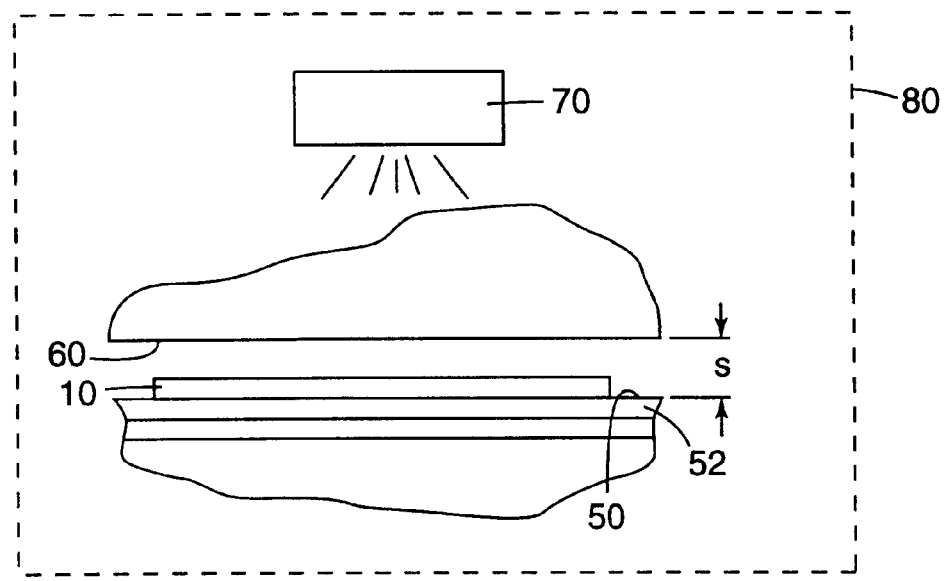
FIG. 10 is a schematic diagram of one system and apparatus for relaxing an article formed on a heat-relaxable substrate.

FIG. 10 illustrates one embodiment of a system 80 for using electromagnetic energy to relax a substrate including heat-relaxable material while reducing or eliminating curling or other distortions during relaxation. The system 80 is designed for use with articles that include electromagnetic energy sensitive material as described in any of the embodiments described above in connection with FIGS. 1–9. In other words, the system 80 is useful in the direct heating method using articles that include an electromagnetic energy sensitive material in their construction.

The apparatus used in the system 80 includes a pair of opposing generally planar surfaces 50 and 60 that face each other and are spaced apart from each other, between which the article, such as a substrate or array, 10 is located. By locating the article 10 between the surfaces 50 and 60, curling or other deformation of the article 10 caused by relaxation can be reduced or eliminated. It is preferred that spacing s between the surfaces 50 and 60 be slightly larger than the thickness of the article 10 after relaxation to reduce the likelihood that the article 10 is constrained from relaxing due to frictional forces between the article 10 and the surface 50 and 60. In some aspects, it may be preferred that the spacing be about 4 millimeters (mm) or less, more preferably about 3 mm or less, and even more preferably about 2 mm or less. It may also preferred that any components between the source of electromagnetic energy 70, e.g., a microwave generator, and the article 10 be substantially transparent to the electromagnetic energy.

To facilitate its use with articles including Curie point materials as the electromagnetic energy sensitive material, the system 80 may optionally include an electrically conductive ground plate in proximity to at least one of the surfaces 50 and 60. In the illustrated embodiment, a ground plane 52 is located beneath surface 50. As discussed above, the ground plane may be useful to reduce or prevent heating of the articles by electric field effects and to enhance heating by magnetic field effects.

Figure 11:
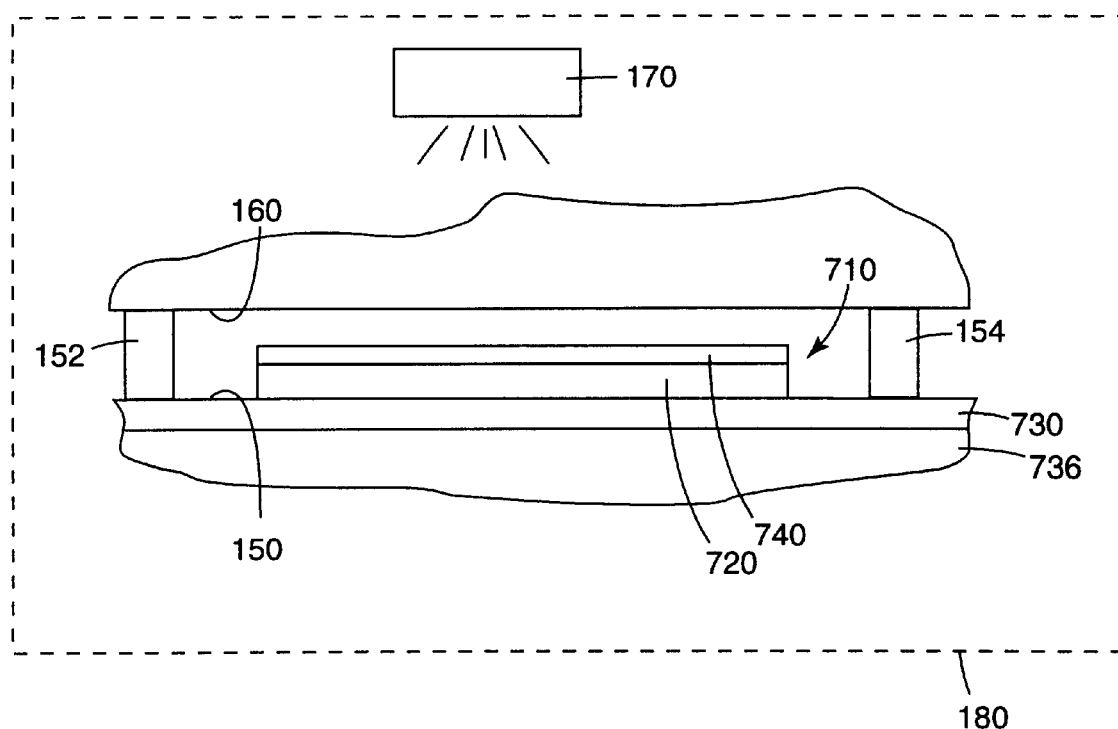
FIG. 11 is a schematic diagram of another system and apparatus for relaxing an article formed on a heat-relaxable substrate.

FIG. 11 illustrates another system 180 that may be used in connection with the direct heating method, i.e., for heating articles that include an electromagnetic energy sensitive material in their construction. In addition, the system 180 itself includes an electromagnetic energy sensitive material and, thus, may also be used in the indirect heating method, i.e., for heating arrays that do not include an electromagnetic energy sensitive material in their construction, e.g., arrays described in WO 99/53319 (HIGH DENSITY, MINIATURIZED ARRAYS AND METHODS OF MANUFACTURING SAME, published Oct. 21, 1999).

The system 180 may include an electromagnetic source 170 (e.g., a microwave generator) as well as an apparatus having two opposing generally flat surfaces 150 and 160 that face each other and are spaced apart from each other, between which an article 710 (including for illustration purposes substrate 720 and linking agent coating 740) can be located. By placing the article 710 between the surfaces 150 and 160, curling or other deformation of the article 710 caused by relaxing can be reduced or eliminated.

It is preferred that the spacing between the surfaces 150 and 160 be slightly larger than the thickness of the article 710 after relaxation to reduce the likelihood that the article 710 is constrained from relaxing due to frictional forces between the article 710 and the surfaces 150 and 160. In some aspects, it may be preferred that the spacing be about 4 millimeters (mm) or less, more preferably about 3 mm or less, and even more preferably about 2 mm or less. That spacing between surfaces 150 and 160 may be accomplished by any suitable mechanism such as, e.g., shims 154 and 154 as illustrated in FIG. 11. It is preferred that the spacing between the surfaces 150 and 160 be adjustable such that, after the article 710 is relaxed, the spacing between surfaces 150 and 160 can be reduced to compress the article 710 while it is still warm, thereby potentially further improving its flatness. The adjustable spacing may be accomplished by, e.g., removing the shims 152 and 154 from the apparatus such that the upper surface 160 lays on the article 710.

Because the article 710 may not itself include any electromagnetic energy sensitive material, or at least any electromagnetic energy sensitive material in sufficient amounts to provide the thermal energy required to relax the substrate 720 of the article 710, the apparatus used to support the article 710 during relaxation preferably includes electromagnetic energy sensitive material. In the illustrated apparatus, the lower surface 150 includes a layer 730 that preferably includes electromagnetic energy sensitive material. The layer 730 may consist essentially of electromagnetic energy sensitive material, or it may include electromagnetic energy sensitive material in, e.g., particulate form as described above in connection with some of the articles. Regardless of the actual form in which the electromagnetic energy sensitive material is provided, however, the layer 730 preferably contains electromagnetic energy sensitive material in sufficient amounts to convert enough electromagnetic energy to thermal energy that can be used to relax the article 710.

Also illustrated in FIG. 11 is an optional electrically conductive ground plane 736 located underneath the layer 730 including electromagnetic energy sensitive material. If the electromagnetic energy sensitive material used in layer 730 is a Curie point material, the ground plane 736 can reduce or prevent heating via electric field effects while enhancing the heating via magnetic field effects.

Furthermore, although the system 180 is discussed as being useful for articles that do not themselves contain any electromagnetic energy sensitive material, it should be understood that articles that do include an electromagnetic energy sensitive material as discussed above with respect to, e.g., FIGS. 1–9, may be used in connection with the system 180.

Figure 12:
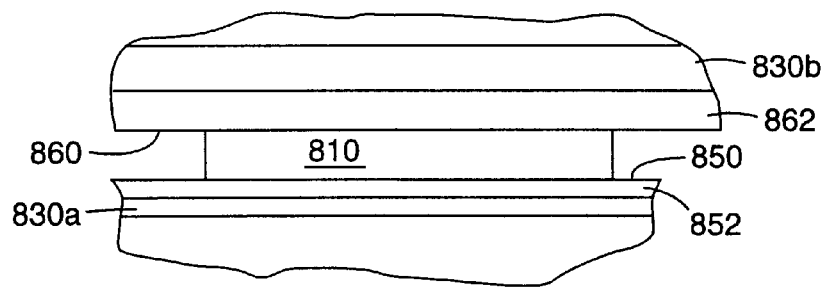
FIG. 12 is a schematic diagram of another system and apparatus for relaxing an article formed on a heat-relaxable substrate.

FIG. 12 illustrates another apparatus useful in, e.g., the system 180 that includes two opposing generally planar surfaces 850 and 860, between which an article 810 (such as a substrate or array) can be located. By placing the article 810 between the surfaces 850 and 860, curling or other distortion of the article 810 occurring during relaxation can be reduced or eliminated. It is preferred that the spacing between the surfaces 850 and 860 be slightly larger than the thickness of the article 810 after relaxation to reduce the likelihood that the article 810 is constrained from relaxing due to frictional forces between the article 810 and the surfaces 850 and 860.

To further reduce any frictional forces that may constrain relaxation of the article 810, the surface 850 and 860 preferably include layers 852 and 862 of, respectively, a low surface energy material, e.g., polytetrafluoroethylene (PTFE) or similar materials, that reduce sticking to the surfaces 850 and 860. Another difference between the apparatus of FIGS. 11 and 12 is that the apparatus of FIG. 12 includes two layers 830a and 830b that each include electromagnetic energy sensitive material, with layer 830a located below the array 810 and layer 830b located above the article 810.

TEST METHODS

Optical Density

The optical densities described herein were determined using a Macbeth TD931 Densitometer Instrument (Macbeth Process Measurements, Division of Kollmorgen Corporation, New York, U.S.A.). This instrument has an orthochromatic filter and measures optical density (OD) readings from 0 to 4.0 (±0.02). The instrument was calibrated before use with a standard at 3.04 OD.

Test Method X:

A square substrate of about 75 millimeters (mm) by about 75 mm was placed inside the center of a microwave oven (Sharp Microwave Oven, Model R-510BK, 1100 watts power) and the sample was subjected to microwave radiation at full power for the time indicated in Table 1. After that period, the heated substrate was removed from the oven, placed on a smooth flat surface, and flattened by placing a glass microscope slide on the top surface of the film until cooled.

Test Method Y:

A square substrate of about 75 mm by about 75 mm was placed in a device similar to that illustrated in FIG. 11. The upper surface was formed by a ceramic block (McMaster Carr Supply Company, Chicago, Ill., U.S.A., 150 mm square by 13 mm thick). The lower surface was formed by a pad of Curie point material as described below located in a depression formed in a second ceramic block, the depression having the same dimensions as the pad. The dimensions of the pad were about 125 mm×90 mm, with a thickness of about 0.75 mm. A ground plane was not included in the device. Shims were used to space the upper surface about 3 mm from the lower surface (such that the flat sample substrate was not in contact with the upper surface). The device, with the sample located therein, was subjected to microwave radiation (using the same oven as in Method X at full power) for the time indicated in Table 1.

After sample was heated by microwave energy for the indicated period of time, the shims placing the upper surface from the lower surface were removed such that the upper surface was allowed to make contact with the relaxed sample. The flat, relaxed sample was removed and the Curie point pad in the device was allowed to cool until it reached 50±3° C. At this point, the next sample was placed on the pad and the above relaxation process was repeated for all samples.

The pad of Curie point material was made in the following manner: a mixture of 15.4 g of Dow Corning Sylgard 182 Silicone (14.0 g silicone elastomer plus 1.4 g crosslinker) and 23.9 ml of metal powder (74.6 g) was prepared by hand mixing with a spatula. The metal powder was an amorphous alloy with the composition (atom %) of 69% iron, 8% chromium, 15% phosphorus, 5% carbon and 3% boron, with a particle size under 35 microns. The metal powder had a Curie onset temperature of 151° C. The uncured silicone/metal mixture was placed in a sandwich construction (top to bottom): precision surfaced aluminum plate (6 mm thick)/unprimed polyethylene terephthalate film (0.05 mm)/silicone-metal surrounded by 0.75 mm thick spacers/unprimed polyethylene terephthalate film (0.05 mm)/precision surface aluminum plate (6 mm thick). This stack of layers was pressed flat for 10–15 minutes. The silicone material with the metal powder container therein was then cured by placing the stack of layers in a 90° C. oven for 12 hours.

EXAMPLES

The following examples merely serve to further illustrate features, advantages, and other details of the invention. It is to be expressly understood, however, that while the examples serve these purposes, the particular ingredients and amounts used as well as other conditions and details are not to be construed in a manner that would unduly limit the scope of this invention.

All of the examples involved sample substrates that were formed from oriented polyethylene film (Cryovac D955) from Sealed Air Corporation (Simpsonville, S.C., U.S.A.).

The examples indicate that the oriented polyethylene film itself exhibits no discernible relaxation in response to exposure to microwave energy, but that heating of an electromagnetic energy sensitive material that can conduct thermal energy to the heat-relaxable material in the substrates can be effective in relaxing the substrates without adversely affecting the hybridization properties of the arrays.

TABLE 1

| Example | Optical Density | Method X (seconds) | Method X Result | Method Y (seconds) | Method Y Result |
|---|---|---|---|---|---|
| 1 | 0 | 600 | no relaxation | 90 | relaxation |
| 2 | 0 | 600 | no relaxation | 60 | relaxation |
| 3 | 0 | 600 | no relaxation | 40 | relaxation |
| 4 | 0.11 | 70 | relaxation | 40 | relaxation |
| 5 | 0.10 | 70 | relaxation | 40 | relaxation |
| 6 | 0.19 | 10 | relaxation | 10 | relaxation |
| 7 | 0.15 | 10 | relaxation | 10 | relaxation |
| 8 | 0.54 | 10 | relaxation | 5 | relaxation |
| 9 | 0.26 | 15 | relaxation | 10 | relaxation |
| 10 | 0.26 | 2 | arcing | 5 | relaxation |
| 11 | 0.15 | 60 | constrained relaxation | 60 | constrained relaxation |
| 12 | 0.33 | 10 | relaxation | 10 | relaxation |
| 13 | 0.15 | 10 | relaxation | 10 | relaxation |
| 14 | 0.13 | 15 | relaxation | 15 | relaxation |
| 15 | 0.18 | 10 | relaxation | 10 | relaxation |
| 16 | 0.13 | 15 | relaxation | 15 | relaxation |

EXAMPLE 1

A 0.025 mm thick oriented polyethylene film was coated with a 0.75% azlactone copolymer solution(70:30 percent ratio of N,N-dimethylacrylide/vinyl dimethyl azlactone copolymers) in IPA that was crosslinked with 10% EDA using a standard extrusion coating method. This coated substrate was further coated with a 0.3% solution of Linear PEI in IPA. There was no discernible relaxation after 10 minutes of exposure to microwave radiation during Method X testing. Using Method Y, the sample substrate was relaxed, i.e., for purposes of these examples, all discernible relaxation had ceased, although some distortions in the shape of the relaxed substrates was observed. It is theorized that these distortions may have been caused by the array sticking to the Curie point material pad during extended processing times. These distortions may be less frequent in substrates that include a metal coating on the substrate.

EXAMPLE 2

A 0.025 mm thick oriented polyethylene film was printed with a pattern of circular spots according to the method described in Example 1 of WO 99/53319 (HIGH DENSITY, MINIATURIZED ARRAYS AND METHODS OF MANUFACTURING SAME, published Oct. 21, 1999).

The sample substrate exhibited no visible relaxation after 10 minutes of exposure to microwave radiation during Method X using. Using Method Y, the sample substrate was relaxed, although some distortions in the shape of the relaxed substrates was observed. It is theorized that these distortions may have been caused by the array sticking to the Curie point material pad during extended processing times. These distortions may be less frequent in substrates that include a metal coating on the substrate.

EXAMPLE 3

A 0.015 mm thick oriented polyethylene film was supplied with a pattern of spots as in Example 2. The sample substrate exhibited no visible relaxation after 10 minutes of exposure to microwave radiation during Method X testing. Using Method Y, the sample substrate was relaxed, although some distortion in the shape of the relaxed substrates was observed. It is theorized that these distortions may have been caused by the array sticking to the Curie point material pad during extended processing times. These distortions may be less frequent in substrates that include a metal coating on the substrate.

EXAMPLES 4 and 5

A 0.025 mm thick oriented polyethylene film was coated with a layer of titanium using standard sputtering methods with a web coater manufactured by Mill Lane Engineering (Lowell, Mass., U.S.A.). The sample substrates were heated by Method X and Method Y as indicated in Table 1 to relax the substrate until no further relaxation was observed.

EXAMPLES 6–8

A 0.025 mm thick oriented polyethylene film was coated with a layer of titanium using standard sputtering methods with a web coater manufactured by Mill Lane Engineering (Lowell, Mass., U.S.A.). Sample substrates were heated by Method X and Method Y as indicated in Table 1 until no further relaxation was observed.

After relaxation by Method Y, striations from excessive heating were observed in the relaxed sample substrate of Example 8.

EXAMPLE 9

A 0.025 mm thick oriented polyethylene film was plasma treated in an oxygen environment followed by coating with chromium (Cr) using a vapor deposition method in which the metal is vaporized by electron beam evaporation out of a graphic crucible insert made by Denton Vacuum (Moorestown, N.J., U.S.A.). The chromium coated sample substrates were tested using both Methods X and Y and full relaxation occurred in both tests.

EXAMPLE 10

A 0.025 mm thick oriented polyethylene film was plasma treated in an oxygen environment followed by coating with gold (Au) using a vapor deposition method in which the metal is vaporized by electron beam evaporation out of a graphite crucible insert made by Denton Vacuum (Moorestown, N.J., U.S.A.). The microwave energy was discontinued after 2 seconds during Method X testing due to visible arcing of the sample substrate. After relaxation by Method Y, striations from excessive heating were observed in the relaxed sample substrate. It is believed that arcing could be prevented or reduced by providing a thinner coating of Au.

EXAMPLE 11

A 0.025 mm thick oriented polyethylene film was plasma treated in an oxygen environment followed by coating with tin (Sn) using a vapor deposition method in which the metal is vaporized by electron beam evaporation out of a graphite crucible insert made by Denton Vacuum (Moorestown, N.J., U.S.A.). It appears that both samples were constrained from further relaxation due to the physical nature of the Sn coating.

EXAMPLE 12

A 0.025 mm thick oriented polyethylene film was coated with a layer of titanium, followed by coating of the titanium layer with a 0.75% azlactone copolymer solution (70:30 percent ratio of N,N-dimethylacrylide/vinyl dimethyl azlactone copolymers) in isopropyl alcohol (IPA) (2-Propanol, Aldrich, Milwaukee, Wis., U.S.A.) that was crosslinked with 10% ethylenediamine (EDA, Aldrich) using a standard extrusion coating method. This coated substrate was further coated with a 0.03% solution of polyethyleneimine (Linear PEI, Aldrich) in IPA. The sample was then relaxed by both Methods X and Y.

EXAMPLE 13

A 0.025 mm thick oriented polyethylene film was coated with a layer of titanium, followed by coating of the titanium layer with a 0.75% azlactone copolymer solution (70:30 percent ratio of N,N-dimethylacrylide/vinyl dimethyl azlactone copolymers) in IPA that was crosslinked with 10% EDA using a standard extrusion coating method. This coated substrate was further coated with a 0.3% solution of Linear PEI in IPA. The sample was then relaxed by both Methods X and Y.

EXAMPLE 14

A 0.015 mm thick oriented polyethylene film was coated with a layer of titanium, followed by coating of the titanium layer with a 0.75% azlactone copolymer solution (70:30 percent ratio of N,N-dimethylacrylide/vinyl dimethyl azlactone copolymers) in IPA that was crosslinked with 10% EDA using a standard extrusion coating method. The coated substrate was further coated with a 0.3% solution of Linear PEI in IPA. The sample was then relaxed by both Methods X and Y.

EXAMPLES 15 and 16

A 0.015 mm thick oriented polyethylene film was coated with titanium by standard sputtering methods using a web coater manufactured by Mill Lane Engineering (Lowell, Mass., U.S.A.). Sample substrates were heated by Method X and Method Y as indicated in Table 1 until no further relaxation was observed.

EXAMPLE 17

This example serves to demonstrate that DNA can be adsorbed onto the coated substrate and subjected to microwave energy without adversely affecting hybridization of the DNA to a complementary sequence.

Arrays on oriented polyethylene film substrates prepared according to Example 12 were tested according to the following protocol. Arrays on standard non-shrinking positively charged nylon substrates 40 mm×8 mm, 0.165 mm thick (Schleicher and Schuell, BR0812, BioRobotics Inc., Woburn, Mass., U.S.A.) were also prepared as controls.

Samples of *Patreurella Multocida* DNA (Gene Bank Accession No. E05329) were prepared with sterile DNase and RNase free water (Catalog No. 10977-015, Life Technologies, Baltimore, Md., U.S.A.) using the following primer sets: forward primer, AGAGTTTGATCATGGCT-CAG (SEQ ID NO:1), [Bases 09–28] and reverse primer, AGCAGCCGCGGTAATACG (SEQ ID NO:2), [Bases 523–540]. The samples had the following compositions: Undiluted—25 nonograms per microliter (ng/$\mu$l); 1:10–2.5 ng/$\mu$l; 1:50–0.5 ng/$\mu$l; 1:100–0.25 ng/$\mu$l; and 1:1000–0.025 ng/$\mu$l.

Six microliters ($\mu$l) of denatured alcohol and 9 $\mu$l of a solution including 5× sodium chloride sodium citrate (SSC) (Catalog No.15557-044, Life Technologies, Baltimore, Md., U.S.A.) and 0.2% sodium dodecyl sulfate solution (SDS) (Catalog No. 1553-035 Life Technologies, Baltimore, Md., U.S.A.) were added to each dilute DNA sample and a negative control sample.

The diluted DNA samples prepared as described above were heated for 10 minutes at 100° C. and immediately placed on ice. After spinning, 2 $\mu$l of each diluted DNA sample was spotted onto each of the oriented polyethylene substrates and the nylon controls in a known pattern. The nylon control substrates were rinsed with 2×ssc prior to spotting. All of the spotted arrays were allowed to air dry.

A first set of three spotted oriented polyethylene film substrates were then heated according to Method Y described above. Substrate one was heated for seven seconds. Substrate two was heated for ten seconds. Substrate three was heated for twelve seconds. After stopping the microwave oven after heating each substrate, the shims were removed from the apparatus and then the entire device was removed from the oven. The top plate of the device was removed and the substrate was allowed to cool for about 30 seconds before removing it from the pad of Curie point material. Before each heating cycle, the entire device was cooled to 50±3° C.

A second set of three oriented polyethylene film substrates were spotted and then heated according to Method Y as described above for ten seconds, thirteen seconds, and fifteen seconds, respectively. Before each heating cycle, the device was cooled to 25±3° C.

The cooled, relaxed films and the nylon substrates were then wrapped in SARAN WRAP™ and placed on a transilluminator (Eagle-Eye 11, Stratagene, San Diego, Calif., U.S.A.) for 5 minutes.

After the arrays were completed, they were tested to determine whether exposure to the microwave energy and/or heat during relaxation affected the ability of the arrays on the film substrates to hybridize as compared to the arrays on the nylon substrates. As part of that process, a $^{32}$P labeled primer kit (Catalog No. 300385, Stratagene, Cedar Creek, Tex., U.S.A.) was used to label a complementary sequence to the spotted DNA. The complementary sequence was removed from a −80° C. freezer, thawed on ice and denatured at 100° C. for 10 minutes, after which it was placed on ice.

One nylon substrate array was placed in a 50 milliliter (ml) Falcon tube and two oriented polyethylene substrate arrays were placed in a 50 ml Falcon tube. A Stratagene Quikllyb Buffer (Catalog No. 201220, Stratagene, Cedar Creek, Tex., U.S.A.) was gently inverted to mix the buffer and 5 ml of the buffer was added to each Falcon tube. The Falcon tubes were then placed into glass hybridization tubes which, in turn, were placed in a hybridization oven and mixed for 30 minutes at 68° C. After the initial 30 minute period, 100 μl of the labeled complementary DNA was added to each Falcon tube and the tubes were returned to the hybridization oven for an additional 3 hours 68° C.

After removing the Falcon tubes from the oven, they were decanted and the arrays were placed in covered washing dishes. A washing solution of 200 ml of 6×SSC and 0.1% SDS was added to each washing dish. The cover was replaced on each of the washing dishes, which were placed on a shaker (LaPine Shaker, Fisher Scientific, Wood Dale, Ill. U.S.A.) and agitated at medium speed and mixed for 10 minutes. The original wash solutions were then decanted from the washing dishes and an additional 200 ml of the washing solution was added to each of the washing dishes and agitated on the shaker at medium speed and mixed for an additional 10 minutes, followed by decanting of the wash solutions.

Each of the washed arrays were sealed in heat-sealed bags and then placed onto a PhosphorImager cassette. The cassette was closed and the radioactive signals from the arrays were allowed to transfer overnight. The results were then analyzed using the Molecular Dynamics PhosphorImager (Molecular Dynamics PhosphorImager, Model SF, Sunnyvale, Calif., U.S.A.) and ImageQuant software.

No appreciable difference was observed in the signal intensity of the arrays on the nylon substrates versus the arrays formed on the oriented polyethylene film substrates. As desired, detectable signals were obtained (under the exposure conditions) from the first four dilutions used in preparation of the arrays. Had significant degradation of the DNA occurred during the microwave heating of the oriented polyethylene film substrates, these lower dilutions would not be expected to be observed. The results indicated that microwave heating had no appreciable effect on hybridization of the arrays.

The preceding specific embodiments are illustrative of the practice of the invention. This invention may be suitably practiced in the absence of any element or item not specifically described in this document. The complete disclosures of all patents, patent applications, publications, and amino acid and nucleotide sequence databank deposits (as referenced herein by their accession number) cited herein are incorporated into this document by reference as if individually incorporated in total.

Various modifications and alterations of this invention will become apparent to those skilled in the art without departing from the scope of this invention, and it should be understood that this invention is not to be unduly limited to illustrative embodiments set forth herein, but is to be controlled by the limitations set forth in the claims and any equivalents to those limitations.

---

---

What is claimed is:

1. A method of relaxing an array, comprising:
   providing an array comprising a heat-relaxable substrate and reactants affixed thereto;
   providing electromagnetic energy sensitive material in thermal communication with the substrate;
   directing electromagnetic energy towards the electromagnetic energy sensitive material, wherein the electromagnetic energy is converted into thermal energy and conducted to the heat-relaxable material, thereby causing the heat-relaxable material in the substrate to relax.

2. The method of claim 1, wherein the array further comprises linking agents.

3. The method of claim 2, wherein the linking agents are included in a linking agent coating on the substrate.

4. The method of claim 2, wherein the linking agents comprise an azlactone moiety.

5. The method of claim 2, wherein the reactants are affixed to the linking agents at the plurality of binding sites.

6. The method of claim 1, wherein the reactants are selected from the group consisting of nucleic acids, proteins, and carbohydrates.

7. The method of claim 1, wherein the reactants comprise oligonucleotides.

8. The method of claim 1, wherein the reactants comprise cDNA.

9. The method of claim 1, wherein the electromagnetic energy sensitive material comprises a Curie point material.

10. The method of claim 9, wherein the heat-relaxable material of the substrate has a relaxation temperature, and further wherein the Curie point material has a Curie temperature of at least about the relaxation temperature.

11. The method of claim 9, further comprising providing an electrically conductive ground plane in proximity with the Curie point material.

12. The method of claim 1, further comprising contacting the heat-relaxable material with the electromagnetic energy sensitive material.

13. The method of claim 12, further comprising removing the array from contact with the electromagnetic energy sensitive material after directing electromagnetic energy towards the electromagnetic energy sensitive material.

14. The method of claim 1, wherein the electromagnetic energy sensitive material is on the substrate.

15. The method of claim 14, wherein the electromagnetic energy sensitive material comprises a layer comprising one or more metals, one or more metallic compounds, or combinations of one or more metals and one or more metallic compounds.

16. The method of claim 14, wherein the substrate comprises first and second major surfaces, and further wherein the electromagnetic energy sensitive material contacts substantially all of at least one of the first and second major surfaces.

17. The method of claim 1, wherein the substrate comprises a coating including particulates of the electromagnetic energy sensitive material.

18. The method of claim 17, wherein the coating further comprises linking agents.

19. The method of claim 1, wherein the energy-sensitive material is provided in particulate form, and further wherein the electromagnetic energy-sensitive material particulates are located within the heat-relaxable material of the substrate.

* * * * *

UNITED STATES PATENT AND TRADEMARK OFFICE
CERTIFICATE OF CORRECTION

PATENT NO. : 6,482,638 B1
APPLICATION NO. : 09/708916
DATED : November 19, 2002
INVENTOR(S) : Sanjay L. Patil It is certified that error appears in the above-identified patent and that said Letters Patent is hereby corrected as shown below:

Title Page
Item [63] delete "2000" and insert in place thereof -- 1999 --.

Column 1
Line 5, delete "2000" and insert in place thereof --1999 --.
Line 49, insert -- binding -- preceding "sites".

Column 5
Line 7, delete the word " in-plan" and insert in place thereof -- in-plane --.
Line 24, insert -- include -- following "invention".
Line 66, delete the word "relation" and insert in place thereof -- relaxation --.

Column 6
Line 18, delete the word "interesting" and insert in place thereof --intervening --.
Line 35, delete "2" and insert in place thereof -- 20 --.

Column 10
Line 48, insert -- be -- following "also".

Column 11
Line 23, delete "154" and insert in place thereof -- 152 --. (first occurrence)

Column 12
Line 60, delete the word "placing" and insert in place thereof -- spacing --.

Column 13
Line 15, delete the word "surface" and insert in place thereof -- surfaced --.

Column 14
Line 21, delete the word "using" and insert in place thereof -- testing --. (1st)
Line 35, delete the word "distortion" and insert in place thereof -- distortions --.
Line 67, delete the word "graphic" and insert in place thereof -- graphite --.

Column 15
Line 60, delete the word "The" and insert in place thereof --This --.

UNITED STATES PATENT AND TRADEMARK OFFICE
CERTIFICATE OF CORRECTION

PATENT NO. : 6,482,638 B1
APPLICATION NO. : 09/708916
DATED : November 19, 2002
INVENTOR(S) : Sanjay L. Patil It is certified that error appears in the above-identified patent and that said Letters Patent is hereby corrected as shown below:

Column 16
Line 15, delete "8" and insert in place thereof -- 80 --.
Line 18, delete the word "Patreurella" and insert in place thereof --Pasteurella --
Line 26, delete the word "nonograms" and insert in place thereof -- nanograms --.
Line 33, delete "1553" and insert in place thereof -- 15553 --.
Line 63, delete "ll" and insert in place thereof -- II --.

Column 17
Line 2, delete "$^{32}P$" and insert in place thereof -- $^{33}P$ --.

Signed and Sealed this

Twenty-ninth Day of May, 2007

JON W. DUDAS
*Director of the United States Patent and Trademark Office*

SEQUENCE LISTING

```
<160> NUMBER OF SEQ ID NOS: 2

<210> SEQ ID NO 1
<211> LENGTH: 20
<212> TYPE: DNA
<213> ORGANISM: Artificial Sequence
<220> FEATURE:
<223> OTHER INFORMATION: Description of Artificial Sequence:  Forward
      Primer

<400> SEQUENCE: 1
agagtttgat catggctcag                                                 20

<210> SEQ ID NO 2
<211> LENGTH: 18
<212> TYPE: DNA
<213> ORGANISM: Artificial Sequence
<220> FEATURE:
<223> OTHER INFORMATION: Description of Artificial Sequence:  Reverse
      Primer

<400> SEQUENCE: 2
agcagccgcg gtaatacg                                                   18
```